UNITED STATES PATENT OFFICE.

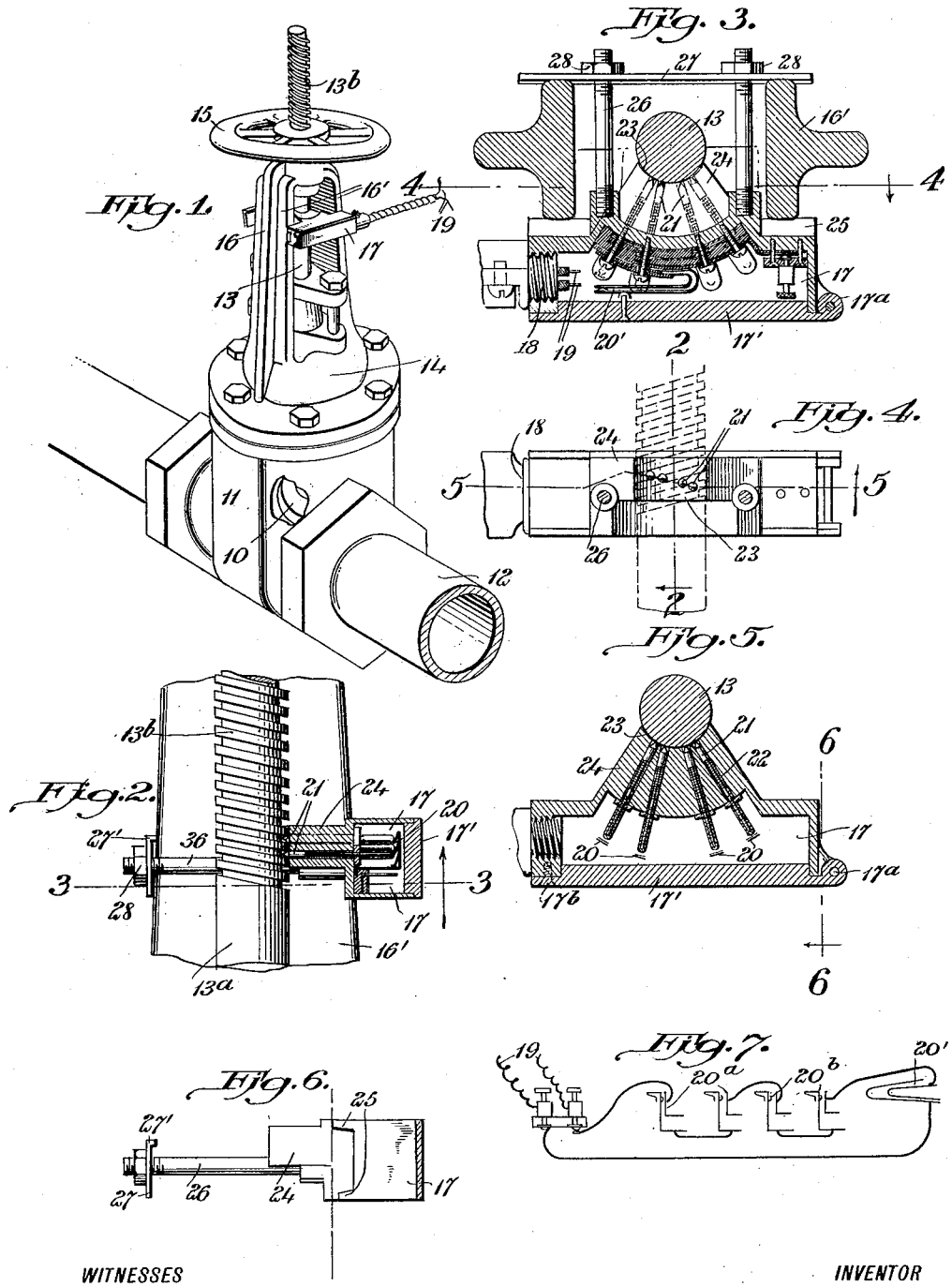

LESTER A. GRIMES, OF NEW YORK, N. Y.

GATE-VALVE SIGNAL.

1,127,232.  Specification of Letters Patent.  Patented Feb. 2, 1915.

Application filed October 22, 1913. Serial No. 796,606.

*To all whom it may concern:*

Be it known that I, LESTER A. GRIMES, a citizen of the United States, and a resident of the city of New York, borough of Brooklyn, in the county of Kings and State of New York, have invented a new and Improved Gate-Valve Signal, of which the following is a full, clear, and exact description.

This invention relates to automatic sprinkler systems and has particular reference to a means for giving a signal at headquarters or at any desired central station to the effect that some valve in the water distribution system has been moved or tampered with.

Among the objects, therefore, of this invention is to provide an electrical contact device for easy and quick application to standard gate valves now in common use.

Another object of the invention is to provide a means whereby the contact attachment is rendered more sensitive and better adapted to indicate valve disturbances than devices in ordinary use.

The foregoing and other objects of the invention will hereinafter be more fully described and claimed and illustrated in the drawings forming a part of this specification in which like characters of reference indicate corresponding parts in all the views, and in which—

Figure 1 is a perspective view of a fragment of water pipe and a usual form of gate valve to which my improvement is attached; Fig. 2 is a vertical section on the line 2—2 of Fig. 4; Fig. 3 is a horizontal section on the line 3—3 of Fig. 2; Fig. 4 is a rear elevation of the contact casing; parts being in section on the line 4—4 of Fig. 3; Fig. 5 is a view similar to Fig. 3 but at a higher plane and substantially on the line 5—5 of Fig. 4; Fig. 6 is a diagrammatic end view of the contact casing and means for securing it to the standard; and Fig. 7 is a diagram indicating a series of pairs of contacts within the casing.

At 10 I show a gate valve in a valve casing 11, such valve being employed to shut off the flow of water or other fluid through a pipe 12. With reference to automatic sprinkler systems, this pipe will be understood as being a main water supply pipe leading to any desired number or location of automatic sprinkler heads. In systems of this character the valves 10 are usually open and the safety and efficiency of the system depends upon such valves being left constantly open so that the automatic sprinklers may be free to operate.

The valve 10 is provided with a stem 13 having a cylindrical portion $13^a$ acting through a stuffing box 14 constituting a part of the valve casing 11. The stem 13 also has at its upper end a quick pitch thread or threads $13^b$ whereby the valve is operated up or down by means of a nut or hand wheel 15. The upper portions of the stem and wheel are guided and supported by means of a yoke or standard 16 extending upwardly from the stuffing box and comprising spaced tapered arms 16'.

When the valve is open and in its normal position, the cylindrical part of the stem 13 projects sufficiently above the stuffing box as to occupy the space between the tapered arms 16' of the standard, as shown in Fig. 1. When, however, the hand wheel is turned so as to cause the valve to close, the threaded part of the stem will project into such space. My improvement comprises a signal device adapted to be connected in permanent fixed relation to the standard 16 and coöperating directly with said valve stem 13. This device specifically in the form herein shown comprises a contact casing 17 of substantially rectangular form and of a size adapting it to be fitted against the lateral edges of the arms 16' and at one side of the stem. At any convenient point the casing is provided with a conduit plug 18 carrying circuit wires 19, said wires being connected to any suitable signal mechanism depending upon a normally closed circuit.

Within the casing 17 I provide a plurality of pairs of contacts 20 each pair of contacts including points $20^a$ and $20^b$. Each of these pairs of contacts includes a plunger 21 having a spring 22 tending to project the plunger outwardly toward the axis of the screw or stem 13 so as to break the contact. Said pairs of contacts 20 are all arranged in series in the circuit above referred to. The plungers have their outer ends arranged so as to project beyond the arc-shaped face 23 of the extension 24 of the casing 17. This extension reaches into engagement with the stem 13, and the face 23 above referred to is made to substantially fit the cylindrical surface of said stem, as shown in Figs. 3 and 5. The plungers 21 are provided with tapered points and are preferably arranged radially with respect to the axis of the stem whereby no damage can result to the contact mechanism during the manipulation of the valve.

In order to gain access to the contact casing 17 to normally protect it from outside influences, the casing is provided with a hinged cover 17' pivoted at one end, as shown at 17ª, the other end of the lid being secured by any suitable fastener, indicated for instance, as a screw at 17ᵇ. In order to detect the opening of the contact casing I provide an auxiliary pair of contacts 20' normally held closed by the lid 17'. The contacts 20', as indicated in the diagram of Fig. 7, are in series with the other pairs of contacts 20, and hence, when the lid 17' is opened for any purpose, the circuit 19 will be broken through the contacts 20', as will be understood best from Fig. 3.

The casing 17 is so constructed by means of end flanges 25 as to make it easily applicable to the tapered arms 16' now commonly in use and in such a manner as to insure the arrangement of the plungers 21 in a substantially perpendicular position with respect to the axis of the stem. These flanges 25 are so arranged that the workmen applying the devices may easily and quickly dress down one of them so as to make the contact casing conform to the taper of the arms 16', as shown in Figs. 2 and 6. I provide preferably a pair of clamping bolts 26 connected at one end to the contact casing. and at the other end adapted to project beyond the opposite edges of the arms 16 and carrying an angle bar 27 whereby the connection is completed with the standard through nuts 28. The angle bar 27 includes a flange 27' so as to compensate substantially for the aforesaid taper of the standard arms.

When the valve is open with the cylindrical part 13ª of the stem elevated, the contact casing is fitted to the standard, as above described and shown in Fig. 1, causing the points of the plungers to bear against the cylindrical surface of the stem and putting the springs 22 thereof under tension. The inner ends of the plungers close the several contacts 20, and with the lid 17' of the casing 17 shut, the circuit will be completed through all of the series of pairs of contacts. If, now, the valve be closed or moved to any great distance toward closed position by operation of the hand wheel 15, one or more of the plunger points will drop into the thread grooves of the stem, breaking the circuit in as many of the contacts 20. As shown in Fig. 4, the plungers 21 are arranged transversely in a spiral reverse to the form of the threads so that the series of plungers extend at an angle across the threads. The dotted lines of Fig. 4 indicate the position of the thread grooves on the side adjacent the plungers. Whether the valve stem be operated or not, if the contact casing should be removed from the stem or if the lid of the casing should be opened, the result at the home or main station would be the same, namely, the making of the signal showing that the valve mechanism at the place indicated has been changed or tampered with. I provide, therefore, a contact device for the particular purpose set forth, which is not only easy of application to standard gate valves now in use, but which is also thoroughly reliable under all conditions of use, it being noted that I make no change or alteration of any kind in the structure of the valve, its stem or the standard.

The several parts of the device may be made of any suitable materials, and the relative sizes and proportions, as well as the general design of the mechanism, may be varied to a considerable extent without departing from the spirit of the invention hereinafter more fully set forth and specifically claimed.

Having thus described my invention, I claim as new and desire to secure by Letters Patent:—

1. The combination with a normally open valve having a non-rotary stem, said stem being cylindrical in part and threaded in part, of an electric contact casing, and means to secure the casing in fixed position adjacent said stem, said casing including one or more pairs of contacts each including a plunger normally in contact with the cylindrical part of the stem but adapted to enter the thread grooves of the stem to open the circuit when the valve is being moved toward closed position.

2. The combination with a normally open gate valve including a standard, a non-rotary valve stem guided in said standard and including cylindrical and threaded parts, of a contact casing, means to secure said casing to said standard in close proximity to the valve stem, a pair of contacts within the casing, a plunger associated with said contacts and movable radially of the casing into coöperation with said stem, the cylindrical portion of the stem serving to maintain the contact normally closed, and means to cause the plunger to drop into the thread groove of the stem to break the circuit when the valve stem is moved toward closed position with respect to the casing.

3. The combination with a normally open gate valve including a reciprocating non-rotary stem having threaded and cylindrical parts and stationary means to support and guide said stem, of a contact casing, means securing said contact casing adjacent the stem through said supporting and guiding means, a plurality of contact plungers arranged radially with respect to the axis of the stem and arranged also in a spiral reverse to the threads of the stem, and means to cause one or more of said plungers to drop into the thread grooves and thereby break the circuit.

In testimony whereof I have signed my name to this specification in the presence of two subscribing witnesses.

LESTER A. GRIMES.

Witnesses:
GEO. L. BEELER,
PHILIP D. ROLLHAUS.

Copies of this patent may be obtained for five cents each, by addressing the "Commissioner of Patents, Washington, D. C."